Jan. 31, 1967  B. A. Z. BRUUN  3,301,929
SINTER-MOLDING PROCESS
Filed Sept. 22, 1964  2 Sheets-Sheet 1
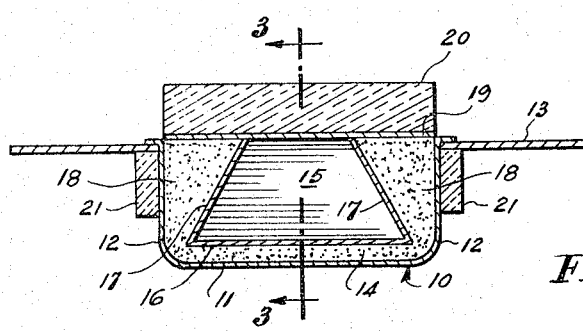
Fig. 2
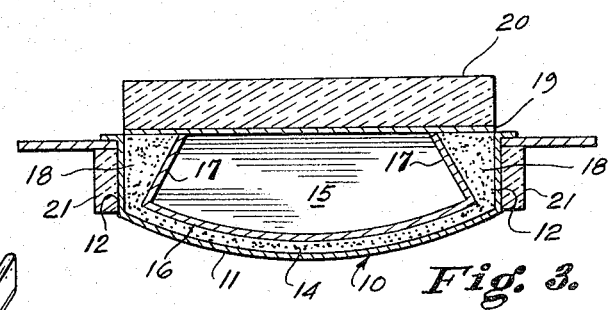
Fig. 3.
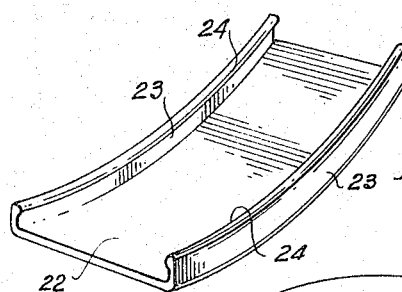
Fig. 5.
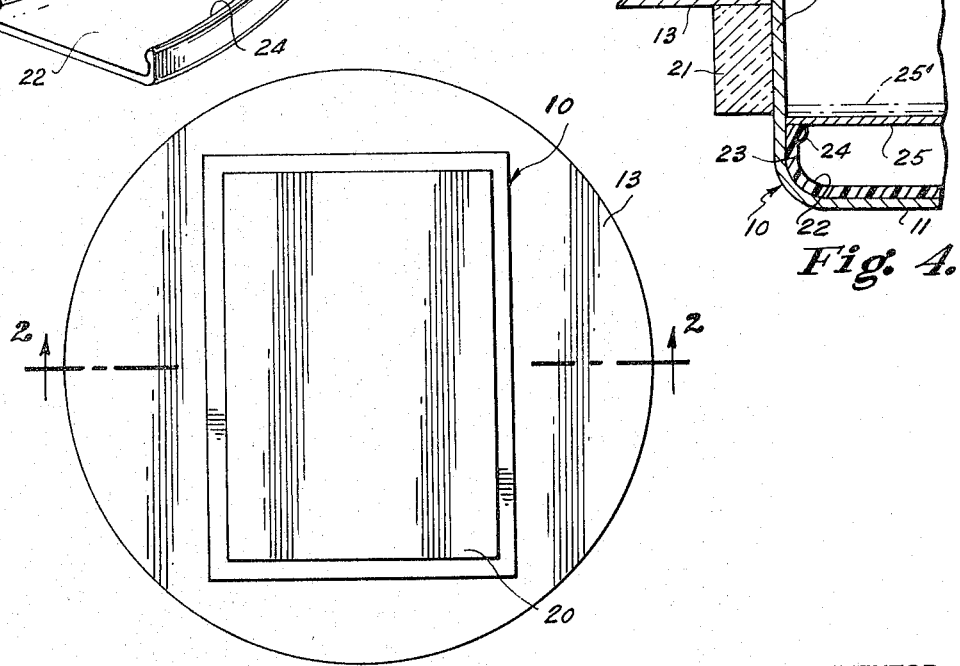
Fig. 4.
Fig. 1.
INVENTOR
BJØRN A. Z. BRUUN
BY
Albert C. Johnston
ATTORNEY Jan. 31, 1967 B. A. Z. BRUUN 3,301,929
SINTER-MOLDING PROCESS
Filed Sept. 22, 1964 2 Sheets-Sheet 2

INVENTOR
BJØRN A. Z. BRUUN
BY
ATTORNEY

United States Patent Office 3,301,929
Patented Jan. 31, 1967

3,301,929
SINTER-MOLDING PROCESS
Bjørn Adler Zeuthen Bruun, Boserubvej,
Farum, Denmark
Filed Sept. 22, 1964, Ser. No. 398,171
Claims priority, application Denmark, Sept. 26, 1963,
4,524/63
7 Claims. (Cl. 264—126)

This invention relates to an improved process for the production of molded articles by the sintering of finely divided solid thermoplastic materials such as powdered polyethenes, powdered nylon, or the like.

It is known that containers and other articles having valuable qualities can be produced by fusing particles of a finely divided solid thermoplastic material such as a powdered polyethene or powdered nylon on a heated molding surface having the configuration of the required article and cooling the dense fused wall structure thus formed. This process is generally known as sintering or sinter-molding, and can be carried out in various ways among which is the method referred to as "static sintering," for example, as disclosed in U.S. Patents Nos. 2,915,788 and 3,039,146, issued to T. Engel.

In the practice of static sinter-molding, the mold is heated externally to a temperature above the melting range of the thermoplastic powder while a mass of the powder is held static against the inner surface of the mold. As particles of the thermoplastic powder contacting the molding surface reach their melting temperature, they become plastic and coalesce into a layer covering the heated surface. With continuation of the heating, this layer increases in temperature and transmits heat to unfused thermoplastic particles contacting the layer, thus gradually bringing such particles to plasticity and coalescing them into its structure until, after a suitable period of heating, a fused plastic layer or wall structure having the required final thickness is formed. When the fused plastic wall structure has attained the required thickness, the unfused thermoplastic powder is removed from the mold and the latter is reheated or further heated to fuse and smooth the inner surface of the plastic wall structure prior to cooling of the latter.

Although it has been proposed to place a core within the mold for reducing the quantity of thermoplastic powder required for filling the mold prior to the heating of the latter and also for reducing the quantity of the unfused thermoplastic powder that has to be removed from the mold after the fused plastic wall structure is formed against the mold surface, such cores are given a configuration similar to that of the mold surface so as to be spaced uniformly from the latter at the sides as well as at the bottom of the mold. By reason of the uniform spacing between the core and mold surface at the sides of the mold, difficulty is experienced in introducing the charge of thermoplastic powder therebetween and there is an inadequate pressure of the thermoplastic powder against the sides of the mold. Although the pressure of the thermoplastic powder against the sides of the mold can be increased by forming the core of a flexible material and by filling the core with water or air under pressure, the foregoing results in undesirable complication of the molding apparatus.

Accordingly, it is an object of this invention to provide an improved sinter-molding process by which the pressure of the finely divided or powdered thermoplastic material against the mold surface, particularly at the sides of the mold, is significantly increased without increasing the difficulty of charging of the mold or the complexity of the molding apparatus.

In accordance with this invention, in the sinter-molding of articles, a core is placed within the hollow mold to rest on a portion of the charge of powdered thermoplastic material at the bottom of the mold, and such core has sides sloping upwardly away from the adjacent sides of the mold so that the remaining portion of the charge filling the space between the sloping sides of the core and the adjacent sides of the mold exerts a pressure outwardly against the latter during the melting and coalescence of particles of the thermoplastic material by heat transmitted through the wall of the externally heated mold. When the core, having its sides sloping upwardly away from the adjacent sides of the mold, is removed upwardly from the latter after the fused plastic wall structure has been formed against the inner surface of the mold, such core effects the removal therewith of substantial quantities of unfused thermoplastic material from the space between the mold and core.

A further object of the invention is to provide a process by which closed hollow articles, such as tanks and the like, can be produced by static sinter-molding of sections or parts of the article and the subsequent joining of the sections.

The above, and other objects, features and advantages of this invention, will be apparent in the following detailed description of illustrative embodiments thereof which is to be read in connection with the accompanying drawings forming a part hereof, and wherein:

FIG. 1 is a schematic top plan view of a mold assembly for practicing sinter-molding in accordance with this invention;

FIG. 2 is a sectional view taken along the line 2—2 on FIG. 1;

FIG. 3 is a sectional view taken along the line 3—3 on FIG. 2;

FIG. 4 is an enlarged, fragmentary sectional view illustrating a step of the process embodying this invention when the article produced by sinter-molding is to have a rim of increased thickness;

FIG. 5 is a perspective view of an article molded in accordance with this invention;

Figure 6:
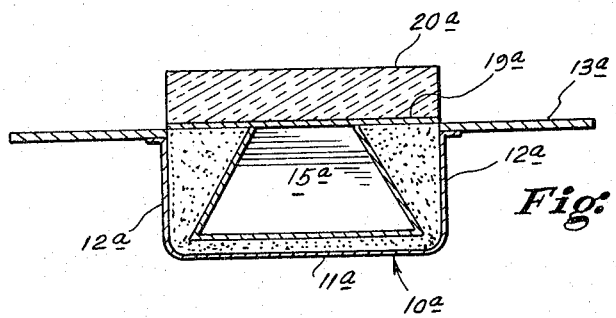
FIGS. 6 and 7 are sectional views similar to that of FIG. 2, but illustrating mold assemblies by which parts or sections of a closed hollow article, such as a tank, can be sinter-molded in accordance with this invention.

Referring to the drawings in detail, and initially to FIGS. 1, 2 and 3, it will be seen that, in accordance with this invention, a static sinter-molding of an article is effected in a mold assembly including an upwardly open mold receptacle 10 consisting of bottom and side walls 11 and 12 of heat transmitting material, for example, thin sheet steel of 0.75 mm. thickness, which is suitably shaped so that the inner surface of mold receptacle 10 has a configuration corresponding to that of the desired article. The mold receptacle 10 is preferably mounted so as to be centered, and open upwardly through a circular plate 13.

Finely divided, solid thermoplastic material, for example, powdered polyethene, nylon, polystyrene or polyvinylchloride, is first introduced into mold receptacle 10 so as to provide a layer 14 covering the bottom 11 of the latter to a depth greater than the wall thickness desired for the article to be produced, for example, to a depth of approximately 2 to 3 cm. Thereafter, a core 15 is inserted in mold receptacle 10 through the open top of the latter so as to rest on the layer 14 of powdered thermoplastic material. The core 15 may also be formed of sheet metal and preferably has a bottom 16 that is similar in shape to the bottom 11 of the mold receptacle, as is apparent from FIGS. 2 and 3. In accordance with this invention, the sides 17 of the core slope upwardly away from the adjacent sides 12 of the mold receptacle.

After placement of core 15 in mold receptacle 10, the spaces 18 defined between the sloping sides 17 of the core and the adjacent sides 12 of the mold receptacle are filled with the remainder of the charge of powdered thermoplastic material. The mold receptacle is then closed by a lid 19 which is suitably insulated, as at 20. The lid 19 rests on top of core 15, and may be of substantial weight so as to contribute to the pressure of the core against the layer 14 of powdered thermoplastic material at the bottom of the mold receptacle.

By reason of the sloping arrangement of side walls 17 of core 15, the force of gravity acting on the powdered thermoplastic material in spaces 18 causes such thermoplastic material to exert a pressure outwardly against the inner or molding surface of side walls 12 of the mold receptacle. Such outwardly directed pressure may be augmented by the weight of lid 19 acting downwardly on the powdered thermoplastic material in spaces 18, and the lid 19 may be further forced downwardly, either manually or by mechanical means, so as to still further increase the outward pressure against the molding surface of side walls 12 by the powdered thermoplastic material between the latter and the sloping side walls 17 of the core.

The closed mold receptacle 10 containing the charge of powdered thermoplastic material between the core 15 and the inner or molding surface of the receptacle is placed in an oven or furnace where it is externally heated to a temperature above the melting range of the powdered thermoplastic material. As particles of the thermoplastic material contacting the heated molding surface reach their melting temperature, they become plastic and coalesce into a layer covering the heated surface. With continuation of the heating, this layer increases in temperature and transmits heat to adjacent unfused thermoplastic particles thus gradually bringing the latter particles to plasticity and coalescing them into its structure until, after a suitable period of heating, a fused plastic layer or wall structure having the required final thickness is formed. It has been found that a wall thickness of 3 to 4 mm. is obtained when the mold assembly is present in the oven or furnace for a period of 3 to 5 minutes.

It will be apparent that the fused plastic wall structure is only formed against those areas of the inner surface of mold receptacle 10 through which heat is transmitted from the exterior of the mold receptacle. Hence, forming of a fused plastic wall structure against certain areas of the mold receptacle 10 can be avoided merely by attaching insulating material to the outer surface of the mold receptacle at such areas, for example, as at 21 on FIGS. 2 and 3.

The mold assembly illustrated on FIGS. 2 and 3 is intended to be employed for the sinter-molding of a section or part of a fender or mudguard 22 of a truck or other vehicle as illustrated on FIG. 5. The section of the fender or mudguard 22 is longitudinally arcuate and has turned or flanged longitudinal edges 23 which are of substantially uniform depth along the length of the mudguard or fender section. Although the side walls of mold receptacle 10 are obviously deeper at the middle of the latter than at its opposite ends, as seen on FIG. 3, the insulating members 21 can cover the upper portions of such side walls and have arcuate lower edges extending along lines generally parallel to the bottom wall 11 of the mold receptacle so as to define the upper margins of flanged longitudinal edges 23 of the fused plastic wall structure formed in the illustrated mold receptacle.

After the mold assembly has been externally heated in an oven or furnace for a period of time sufficient to form the fused plastic wall structure of desired thickness, the mold assembly is removed from the furnace and the lid 19 and core 15 are removed from mold receptacle 10. During upward removal of core 15, substantial quantities of the unfused thermoplastic powder in spaces 18 are removed with the core by reason of the sloping arrangement of sides 17 of the core, so that the amount of unfused thermoplastic powder then remaining within the mold and required to be removed, either by inverting the mold or by suction, is substantially reduced.

After removal of the core and the excess or unfused thermoplastic powder, mold receptacle 10 is placed in another furnace where it is maintained in continuous motion during a reheating or further heating period to fuse and smooth the inner surface of the plastic wall structure. The continuous movement of the mold receptacle during its further heating or reheating ensures that all portions of the plastic wall structure will be subjected to uniform heating even though there may be temperature variations at various locations within the reheating furnace or oven. The desired continuous movement of the mold receptacle can be achieved conveniently by supporting the circular plate 13 on rotatably driven rollers, in which case a continuous rotary motion is imparted to the mold. Such rotary movement of the mold must be at such slow speed that there is no tendency of centrifugal forces to displace the fused plastic wall structure which is softened during the reheating. Although rotary motion is conveniently imparted to the mold receptacle 10 carried by the circular plate 13, it will be apparent that other forms of motion may be imparted thereto in order to avoid variations in the reheating or further heating of the fused plastic wall structure.

Where the article formed by sinter-molding is to have a rim of increased thickness formed along its edge, for example, the rims 24 extending along the turned or flanged edge portions 23 of the mudguard section 22, such rims can be formed merely by pressing downwardly on the edges of the fused plastic wall structure after the same has been subjected to the reheating, and before substantial cooling has been allowed to occur. Thus, as indicated on FIG. 4, a frame or plate 25 which is peripherally shaped so as to fit closely in mold receptacle 10 and which is otherwise shaped to conform to the desired configuration of the edges of the molded article, is pressed downwardly against the edges of the fused plastic wall structure, for example, from the position indicated in broken lines at 25' on FIG. 4 to the position shown in full lines. During such displacement of plate 25 the latter causes the softened edges of the fused wall structure to bulge inwardly and form the thickened rims 24.

Finally, the mold receptacle is cooled, and such cooling preferably takes place while continuous motion of the mold receptacle is effected, as described above, thereby to effect uniform cooling of the entire fused plastic wall structure. The cooling of the fused plastic wall structure causes hardening of the latter so that it can be stripped or removed from the mold receptacle.

Figure 7:
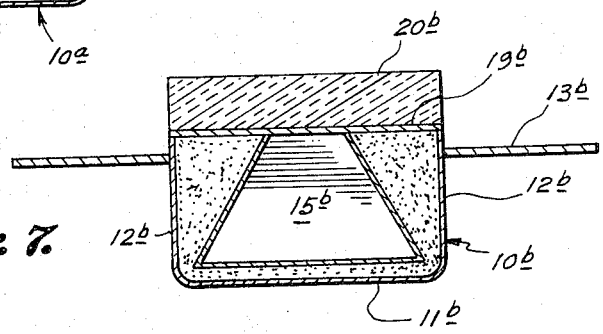
Figure 9:
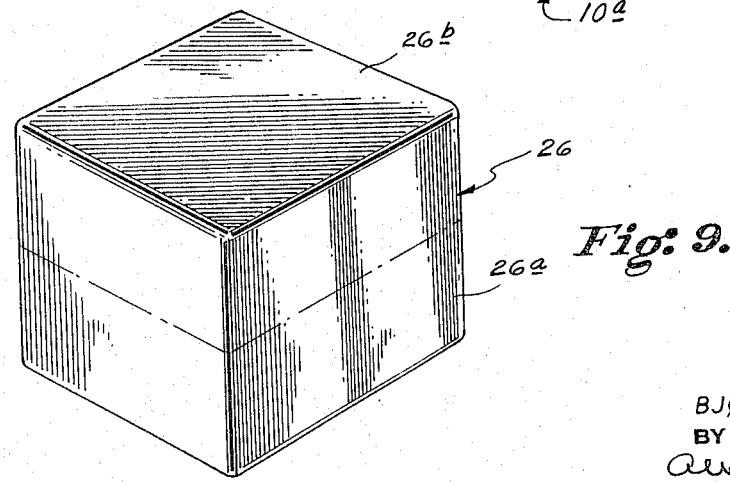
FIG. 9 is a perspective view of a closed hollow article molded in accordance with this invention.

When it is desired to effect static sinter-molding of a closed hollow receptacle, for example, of a tank or the like, as indicated generally at 26 on FIG. 9, such article can be conveniently formed from two hollow sections 26a and 26b which are sinter-molded in accordance with this invention and then joined at their edges. More specifically, the lower section 26a of the closed hollow article 26 can be formed by sinter-molding in the mold assembly of FIG. 6, while the upper section 26b is similarly formed by sinter-molding in the mold assembly of FIG. 7. It will be obvious that the mold assemblies of FIGS. 6 and 7 are generally similar to the mold assembly described with reference to FIGS. 2 and 3 and the several parts thereof are identified by the same reference numerals as the corresponding parts in FIGS. 2 and 3, but with the letters "a" and "b" appended thereto. The mold assembly of FIG. 7 differs substantially from that of FIG. 6 in that the edges of side walls 12b of mold receptacle 10b project beyond the supporting circular plate 13b and such projecting edges of the side walls of mold receptacle 10b are dimensioned to telescope into the top opening of the other mold receptacle 10a.

Figure 8:
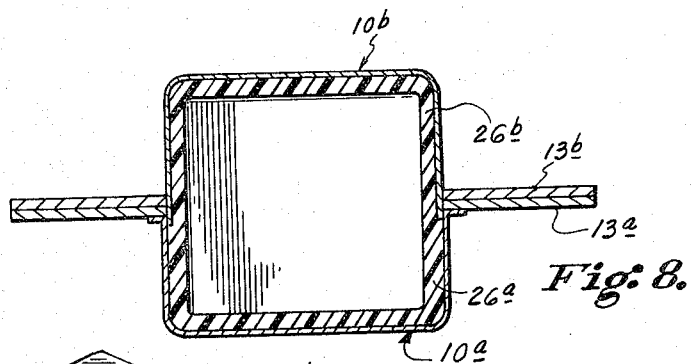
FIG. 8 is a sectional view illustrating the joining together of the parts or sections formed in the mold assemblies of FIGS. 6 and 7.

The mold assemblies of FIGS. 6 and 7 are charged with powdered thermoplastic material to fill the spaces between the mold receptacles 10a and 10b and the respective cores 15a and 15b, whereupon the mold receptacles are closed by the lids 19a and 19b. The two mold assemblies are then placed in an oven or furnace to produce fused plastic wall structures against the inner or molding surfaces of mold receptacles 10a and 10b which are shaped to correspond to the sections 26a and 26b of the article to be formed, as previously described herein. When the fused plastic wall structures formed in mold receptacles 10a and 10b have attained the desired thickness, the mold assemblies are withdrawn from the oven or furnace and the lids and cores are removed therefrom along with the unfused powdered thermoplastic material. Before substantial cooling of the fused plastic wall structures, mold receptacle 10b is inverted and pressed into mold receptacle 10a, as shown on FIG. 8, so that the edge portions of sections 26a and 26b are pressed together. The two engaged mold receptacles are then placed in a furnace and maintained in continuous movement during the further heating or reheating thereof, as previously described, whereby the edge portions of sections 26a and 26b fuse together to form the integral closed hollow article 26 which is removed from the separated mold receptacles following the cooling thereof.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention which is intended to be defined by the appended claims.

The term "finely divided solid thermoplastic material" as used in this specification and in the appended claims shall include commercially available granules of thermoplastic material.

What is claimed is:

1. In a sinter-molding process in which an externally heated hollow mold having an inner surface with the configuration of an article to be produced is charged with a finely divided solid thermoplastic material that will coalesce by melting at the temperature to which the inner mold surface is heated and the heating is continued until, by continued coalescence of particles of said material, a fused plastic wall structure of required thickness is formed on said surface, said wall structure thereafter being cooled to solidify it on said surface; the improvement comprising placing a core within said hollow mold to rest on a portion of said charge of thermoplastic material at the bottom of the mold and which has sides sloping upwardly away from the adjacent sides of the mold so that the remaining portion of said charge filling the space between said sloping sides of the core and adjacent sides of the mold exerts a pressure outwardly against the latter, and removing said core from the mold after said fused plastic wall structure is formed on said inner surface of the mold, thereby to effect the removal with said core of substantial quantities of unfused thermoplastic material from said space between the mold and core.

2. A sinter-molding process as in claim 1; wherein said portion of the charge at the bottom of the mold is introduced into the latter before said core and said remaining portion of the charge is introduced into said space following placement of the core in the mold.

3. A sinter-molding process as in claim 1; further comprising attaching insulating material to the outer surface of said mold at the areas of the latter where forming of a fused plastic wall structure is to be avoided.

4. A sinter-molding process as in claim 1; further comprising closing the top of said mold, prior to the external heating of the latter, by an insulated lid of sufficient weight to press downwardly on said core and on the charge in said space.

5. A sinter-molding process as in claim 1; further comprising reheating the mold following the removal of said core and the unfused thermoplastic material from the mold, and continuously moving the mold during said reheating and during the subsequent cooling of the fused plastic wall structure to ensure uniform reheating and cooling of the wall structure.

6. A sinter-molding process as in claim 1; in which, prior to the cooling of the fused plastic wall structure, the edge of said wall structure is pressed in the direction toward the bottom of the mold to form a rim of increased thickness along said edge.

7. A sinter-molding process as in claim 1; wherein, for the production of a closed hollow article, fused plastic wall structures are formed in two mating molds respectively having inner surfaces with configurations corresponding to parts of the closed hollow article to be produced; and
   wherein, following the removal of said core from each mold and prior to the cooling of the fused plastic wall structures, one of said molds is pressed into the other mold to abut and press together the edges of both fused plastic wall structures for joining the latter.

References Cited by the Examiner

UNITED STATES PATENTS 2,915,788  12/1959  Engel _____ 264—125
3,122,787   3/1964  Adams.

FOREIGN PATENTS 164,288  10/1949  Australia.

ROBERT F. WHITE, *Primary Examiner.*

J. R. HALL, *Assistant Examiner.*